E. A. DAYMON.
AUTOMATIC CYLINDER COCK.
APPLICATION FILED JUNE 2, 1914.
1,153,770.
Patented Sept. 14, 1915.
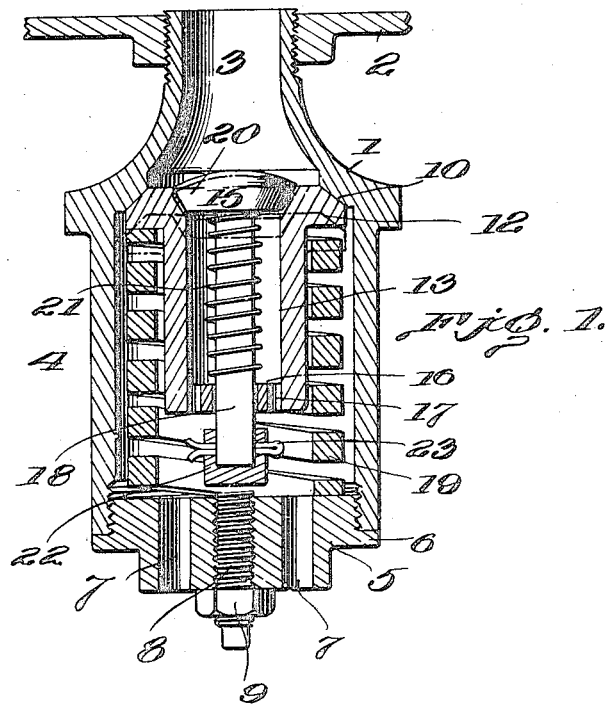
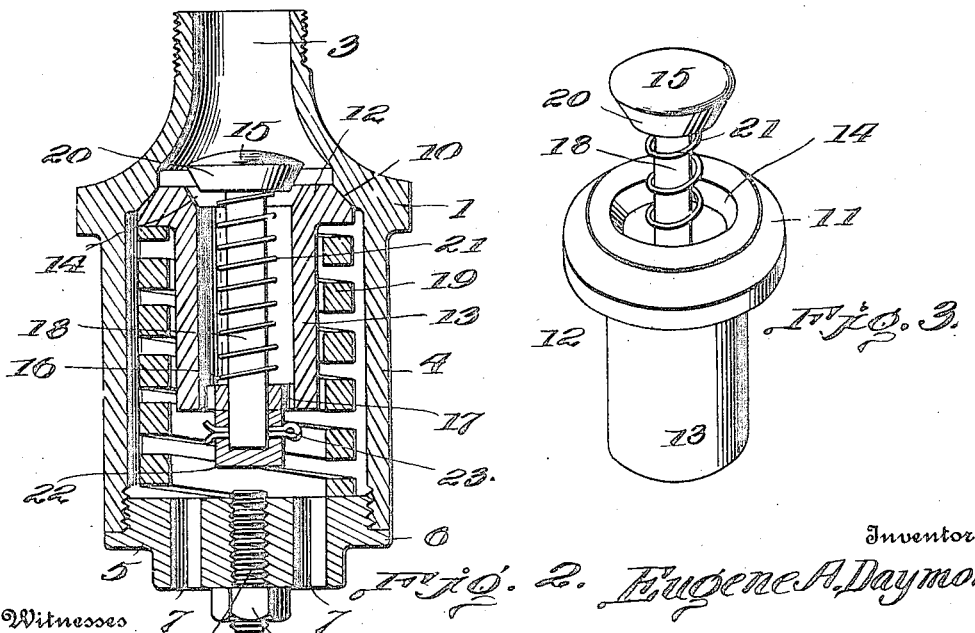
Inventor
Eugene A. Daymon

UNITED STATES PATENT OFFICE.

EUGENE A. DAYMON, OF LIMA, OHIO.

AUTOMATIC CYLINDER-COCK.

1,153,770.

Specification of Letters Patent.

Patented Sept. 14, 1915.

Application filed June 2, 1914. Serial No. 842,441.

*To all whom it may concern:*

Be it known that I, EUGENE A. DAYMON, citizen of the United States, residing at Lima, in the county of Allen and State of Ohio, have invented certain new and useful Improvements in Automatic Cylinder-Cocks, of which the following is a specification.

This invention relates to cylinder drain cocks and has for its object the provision of a simple, efficient and automatically operating device by the use of which all excess water and condensed steam may drain freely from a locomotive or other engine cylinder so as to avoid freezing or bursting of the cylinder heads.

A further object of the invention is to provide a drain cock so constructed that the parts may be readily assembled and may be easily removed in the event of damage. And a still further object of the invention is to provide means whereby the movement of the valves may be regulated.

Other incidental objects of the invention will appear as the description of the invention proceeds, and the invention consists in certain novel features which will be pointed out in the claims following the detailed description.

The invention is illustrated in the accompanying drawings, in which:

Figure 1 is a longitudinal section of a drain cock embodying my present improvement and showing the drainage and relief valves both seated. Fig. 2 is a similar view showing the drainage valve unseated. Fig. 3 is a detail perspective view of the valves.

Corresponding and like parts are referred to in the following description and indicated in all the views of the accompanying drawings by the same reference characters.

In carrying out my invention, I employ a valve casing 1 at each end of the engine cylinder, a portion of which is indicated at 2. The valve casing is provided with a reduced threaded end 3 which is screwed into the wall of the cylinder and has a flared bore leading from the cylinder, as shown. The valve casing has a cylindrical body 4 integral with and extending downwardly or outwardly from the said flared end 3, and the outer or lower end of the said cylindrical body is open and internally threaded, as clearly shown, a head 5 being fitted in the said open end so as to close the same and provide a support for the operating parts. This head 5 is provided with an annular external flange 6 which abuts the open end of the cylindrical body 4 and thereby limits the movement of the head into the said body and also imparts a neat smooth finish to the device. Outlet passages 7 are provided through the said head and in a central threaded opening in the head is fitted an adjusting screw 8, on the outer end of which is mounted a lock nut 9. The inner wall of the valve casing is provided with a ground valve seat 10 at the junction of the cylindrical body 4 and the tapered extremity of the casing which valve seat is normally engaged by the beveled surface 11 of the relief valve 12. The said valve 12 consists essentially of a cylindrical body 13 having an expanded head at its upper end on which the said beveled surface 11 is formed, the said end of the cylindrical body 13 being open and flared, as shown at 14, to provide a seat for the primary valve 15. The lower end of the cylindrical valve body 13 is constructed with a spider 16 having outlet openings 17 therethrough and also provided with a central opening in which the stem 18 of the drainage valve plays. The relief valve is normally held against its seat 10 by a spring 19 which is coiled around the body of the said valve between the valve casing head 5 and the expanded head of the valve, so that the expansion of the spring will act between the casing head and the valve to hold the valve against the seat, the tension of the spring being adjusted so that the pressure exerted by the said spring will be greater than that for which the safety valve on the boiler is set but less than the breaking point of the engine cylinder head.

The valve 15 consists of a disk having a beveled edge 20 adapted to seat against the flared end 14 of the relief valve and form a ground joint therewith, and the stem 18 of said valve is rigid with the disk and depends therefrom through the central opening of the spider 16, as shown. A spring 21 is coiled around the said stem between the said spider and the valve disk and tends normally to lift the valve from its seat, the tension of the spring being such that it will unseat the valve immediately upon the engine throttle valve being closed but when the said throttle valve is opened and live steam being permitted to enter the cylinder, the pressure of such steam will overcome the spring 21 and hold the valve in its closed seated position. To the lower end of the valve stem 18, I secure a stop 22 which is illustrated as consisting of a small cap fitted over the end of the stem and held thereto by a cotter pin 23. It will be understood, however, that the specific construction of this stop and the manner in which it is fastened to the stem is immaterial.

The construction and arrangement of the parts being thus made known, the operation and advantages of the device will be readily understood.

When the throttle valve is open and live steam entering the engine cylinder, the pressure of the steam will hold the drainage valve seated but will not overcome the tension of the spring 19 and, therefore, both valves will remain seated and the drain cock be effectually closed, as shown in full lines in Fig. 1. As soon as the throttle valve is closed, the spring 21 will expand so as to open the drainage valve and the water of condensation will then at once drain through the cylinder cock, flowing around the drainage valve and out through the openings 17 and 7, as will be readily understood on reference to Fig. 2. Should the water in the boiler be at a high level so that the steam passing into the engine cylinder will not be dry and some water will be carried with the same, this surplus water will be compressed between the piston and the head of the cylinder and will then, of course, flow from the cylinder into the drain cock casing. The pressure exerted by this compressed water and such steam as may be carried by the same, will overcome the tension of the spring 19 and unseat the relief valve so that it may flow around the said valve and out through the outlet openings 7. The drainage valve will, of course, be held against the relief valve by the pressure of this compressed water until the end of the valve stem or the head of the cap 22 impinges against the end of the adjusting screw 8, when, of course, further downward movement of the drainage valve will be arrested and said valve will be unseated so that the water may then flow past the valve and out through the openings 7. It will thus be seen by reference to the dotted lines in Fig. 1 that a large outlet will be provided for such compressed water and the pressure upon the cylinder head relieved so that fracture of the heads or stripping of the fastening bolts for the same will be avoided. The adjusting screw 8 may be set to permit any desired movement of the drainage valve relative to the relief valve and will preferably be so adjusted that a downward movement of about $\frac{1}{32}$ of an inch will unseat the drainage valve while the relief valve may continue to move and open to the extent of $\frac{1}{8}$ of an inch or more, the relief valve continuing to move downward until its lower end or spider impinges against the stop 22. It is also obvious that upward opening movement of the drainage valve will be limited by the said stop moving upwardly against the lower end of the relief valve.

It will be readily seen that I have provided a very simple and compactly arranged apparatus which will operate automatically to thoroughly drain the engine cylinder and that freezing of the device will not occur inasmuch as the hot steam playing upon the valves will keep the same at a sufficiently high temperature to prevent cooling of the fluids passing through the device. When the engine is coasting or running on a down grade, there will be sufficient back pressure in the engine cylinder to hold the drainage valve seated.

Having thus described the invention, what is claimed as new is:

1. A drain cock comprising a valve casing, a relief valve mounted therein and normally seated thereagainst, a normally open drainage valve carried by the relief valve and adapted to seat against the same, and means external to the relief valve and common to both valves for limiting the unseating movement of each valve.

2. A drain cock comprising a valve casing, a normally open drainage valve, a relief valve normally seating against the valve casing and providing a seat for the drainage valve, and means below the relief valve for limiting the opening movement of both valves and permitting simultaneous movements thereof in the same direction but of unequal duration.

3. A drain cock comprising a valve casing, a relief valve mounted therein, yieldable means for normally holding said valve seated against the valve casing, a drainage valve adapted to seat upon the relief valve, means tending to unseat the drainage valve, and means below the relief valve and carried by the drainage valve for limiting the unseating movement of both valves and successively arresting their movement away from the seating engagement with the casing.

4. A drain cock comprising a valve casing, a relief valve arranged within the casing and normally seated against the same, a drainage valve carried by the relief valve and adapted to seat upon the same, an adjustable stop mounted in the valve casing in the path of movement of the drainage valve to limit the outward movement of said valve in the casing, and a stop carried by the said drainage valve to limit the outward movement of the relief valve and the movement of the drainage valve relative to the relief valve.

5. A drain cock comprising a valve casing, a drainage valve therein, a relief valve seated against the casing and providing a seat for the drainage valve, the two valves being relatively movable, and means carried by one of the valves and engaging the other valve for limiting the relative movement of the valves and also limiting the movement of the relief valve from its seat on the casing.

6. A drain cock comprising a valve casing, a relief valve seated within the valve casing and having a hollow cylindrical body provided with an outlet in its lower end, a drainage valve adapted to seat upon the relief valve and having a stem extending through and beyond the hollow cylindrical body of the same, a stop upon the extremity of said stem adapted to impinge against the casing and the end of the relief valve to limit the relative movement of the valves and the opening movement of the relief valve, means within the relief valve tending to unseat the drainage valve, and yieldable means tending to hold the relief valve seated against the casing.

7. A drain cock comprising a casing having outlet openings in its lower end, a tubular relief valve arranged within the casing and having outlet openings in its lower end, the upper end of said valve being laterally expanded and adapted to seat against the inner wall of the casing, a spring coiled around said valve and bearing at its upper end against the laterally expanded portion of the same and at its lower end against the lower end of the casing, a drainage valve adapted to seat in the upper end of the relief valve and having a stem extending through the lower end of the relief valve, a spring coiled around said stem and bearing at one end against said valve and at the opposite end against the lower end of the relief valve, a stop on said stem adapted to impinge against the lower end of the relief valve, and a stop on the lower end of the casing in the path of said stem.

In testimony whereof I affix my signature in presence of two witnesses.

EUGENE A. DAYMON. [L. S.]

Witnesses:
ALEN C. WEBB,
CLOYD J. BROTHERTON.